United States Patent [19]

Ngai

[11] 4,118,037
[45] Oct. 3, 1978

[54] RECORD PLAYER

[76] Inventor: Mun-Hay Ngai, 3/Fl. Flat C, 130-132 Argyle St., Kowloon, Hong Kong

[21] Appl. No.: 792,417

[22] Filed: Apr. 29, 1977

[30] Foreign Application Priority Data

Jan. 7, 1977 [GB] United Kingdom ............. 591/77

[51] Int. Cl.$^2$ ............................................. G11B 3/00
[52] U.S. Cl. ..................................... 274/1 A; 274/9 R
[58] Field of Search ........................ 274/1 A, 1 G, 9 R

[56] References Cited

U.S. PATENT DOCUMENTS 3,823,946  7/1974  Nakajima ............................ 274/1 A

FOREIGN PATENT DOCUMENTS 1,176,130  1/1970  United Kingdom ............. 274/1 A
1,302,408  1/1973  United Kingdom ............. 274/1 A Primary Examiner—Richard E. Aegerter
Attorney, Agent, or Firm—Dike, Bronstein, Roberts, Cushman & Pfund

[57] ABSTRACT

A record player comprising a container, a cover attached to said container, a turntable rotatably mounted on said cover, a record on said turntable and having a relatively deep groove at the end of its playing side, an electric motor in said container for driving said turntable mounted in said container and being movable substantially axially towards the turntable under a spring bias, a tone arm having a stylus movable with the speaker towards the turntable so as to engage a record on the turntable, a switch operable by the speaker as the speaker moves towards the turntable to break a circuit supplying driving current to the motor, the switch being operated only as the cover is opened or the stylus drops into a said relatively deep groove at the end of the playing side of the record.

11 Claims, 8 Drawing Figures

RECORD PLAYER

The present invention relates to a record player, particularly but not exclusively for dolls.

It is known to mount record players in dolls. In a known record player, when the record comes to the end of its playing side a switch mechanism is operated by the tone arm to break the electric circuit to the motor. In order to replay the record the tone arm is moved back to the start of the record again. This can be performed automatically by releasing a catch allowing a bias to swing back the tone arm and connect the electric circuit to the motor.

Owing to rough treatment of the toy, the tone arm may be released accidentally and may skid across the surface of the record causing damage to the record and even the stylus.

An object of the present invention is to provide a record player which overcomes the above-mentioned disadvantages.

The invention provides a toy record player comprising a container, a cover attached to said container, a turntable rotatably mounted on said cover, a record on said turntable and having a relatively deep groove at the end of its playing side, an electric motor in said container for driving said turntable, a speaker mounted in said container and being movable substantially axially towards the turntable under a spring bias, a tone arm having a stylus movable with the speaker towards the turntable so as to engage a record on the turntable, a switch operable by the speaker as the speaker moves towards the turntable to break a circuit supplying driving current to the motor, the switch being operated only as the cover is opened or the stylus drops into a said relatively deep groove at the end of the playing side of the record.

An embodiment of the invention will now be described with reference to the accompanying drawing, wherein.

Figure 1:
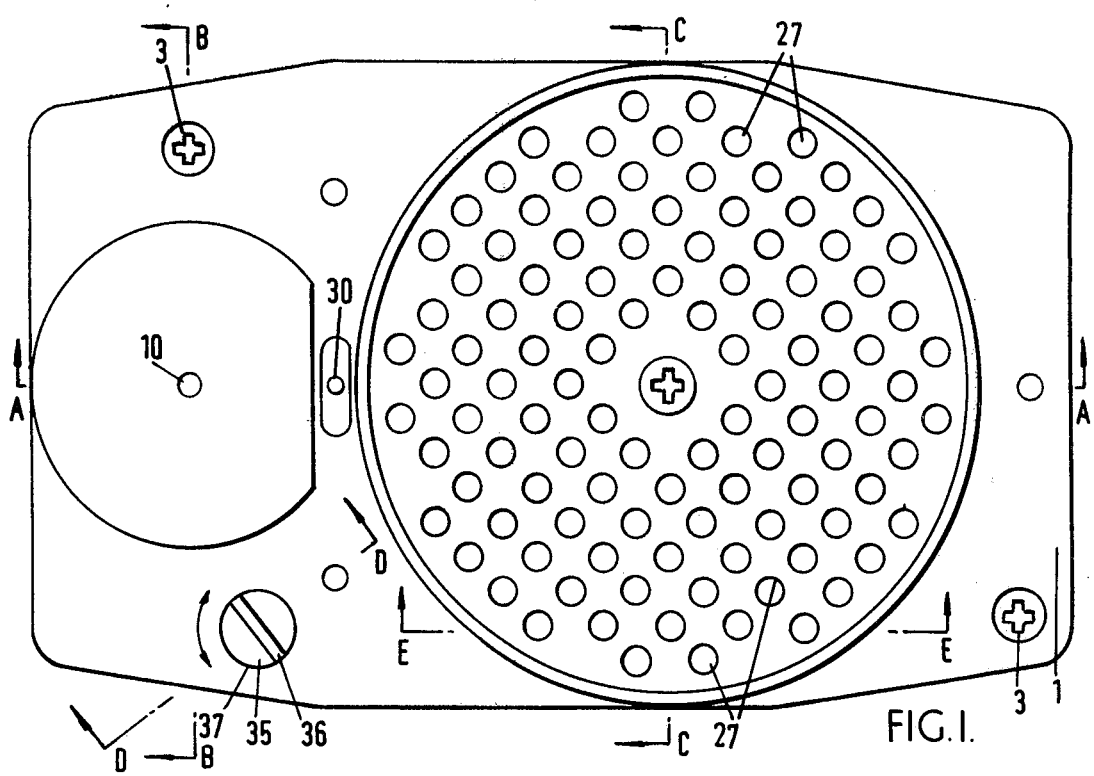
FIG. 1 is a plan view of a record player in accordance with the invention.
Figure 2:
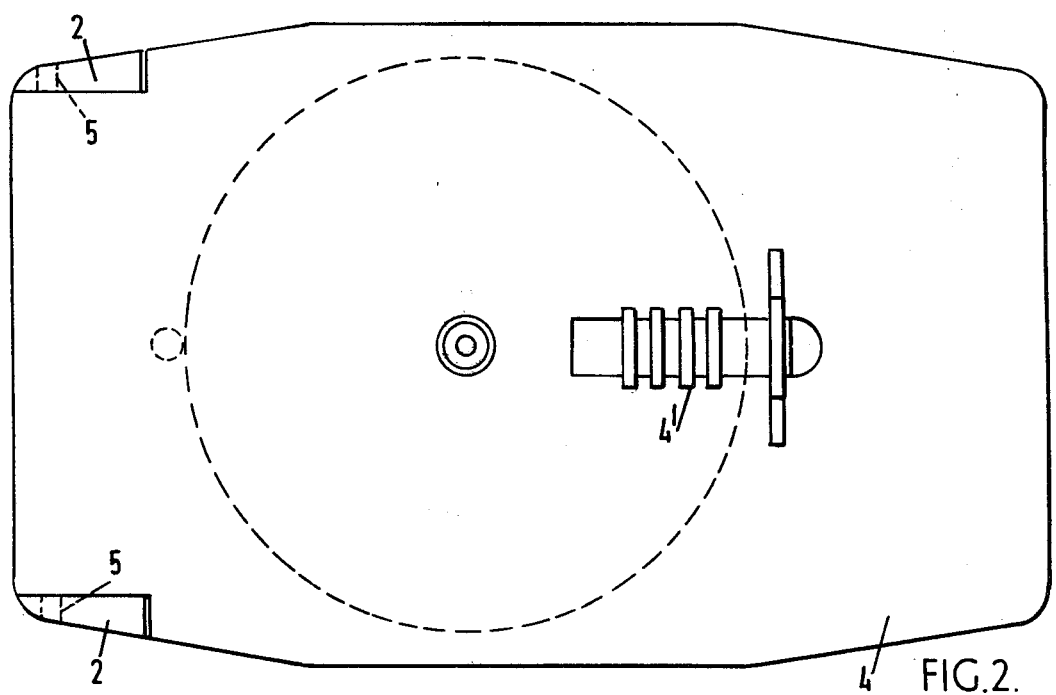
FIG. 2 is an underview of the record player of FIG. 1.
Figure 3:
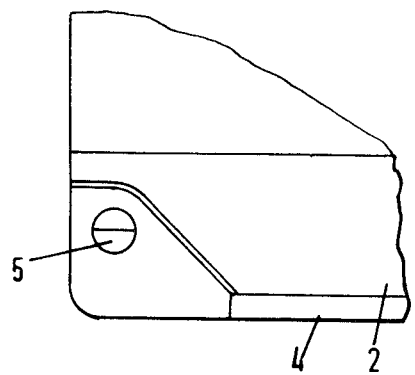
FIG. 3 is a side view of part of the record player of FIG. 1.

In the drawings, a record player is housed in a container having a top 1 and a base 2 connected by means of screws 3. A base cover 4 is hingedly attached to the base 2 by means of hinge pins 5 and is held fast by a slidable catch 4'.

An electric motor 6 is mounted in a carrier 7 provided with trunnions 8 pivotably mounted on trunnion bearings 9 integral with the base 2. The motor 6 has a spindle 10 extending through an aperture of the base 2. The spindle 10 carries a friction sleeve 11, which in operation drives a turntable 12 rotatably mounted on a spindle 13 fixed to the cover 4. The motor is biased by a spring 6' to ensure frictional contact between the sleeve 11 and the peripheral rim of the turntable 12. The turntable 12 has a central boss 14, a central hole accommodating the spindle 13, and a plurality of circumferentially-spaced, resiliently deformable tangs 15. In use the turntable 12 carries a record 12' having a central aperture firmly engaged by the resilient tangs 15. When the cover 4 is closed the sleeve 11 bears tightly with the periphery of the turntable 12 so as to be in frictional engagement therewith. However, when the cover 4 is hinged open the turntable periphery moves out of engagement with the sleeve 11.

A speaker frame 16 carrying a speaker diaphragm 17 has two trunnions 18 pivotably supported in trunnion bearings 19 attached to the base 2. The speaker frame 16 has a depending leg 20 on which a stepped pick-up arm 21 is slidably mounted. The pick-up arm 21 is biassed in a radially outwards direction by means of a coil spring 22 mounted on the leg 20 and engaging a slot 23 in the end of the leg 20. The coil spring 22 also urges the pick-arm 21 upwardly so that a pip 24 on the upper surface of the arm is maintained in constant contact with a diaphragm support 25 connected to the speaker frame 16 and to the apex of the diaphragm 17. The end of the pick-up arm remote from the leg 20 carries a stylus 26. Thus, vibrations picked up by the stylus 26 from the record 16 are transmitted directly to the diaphragm 17 and emitted as sound, which escapes from the top 1 through holes 27.

Figure 4:
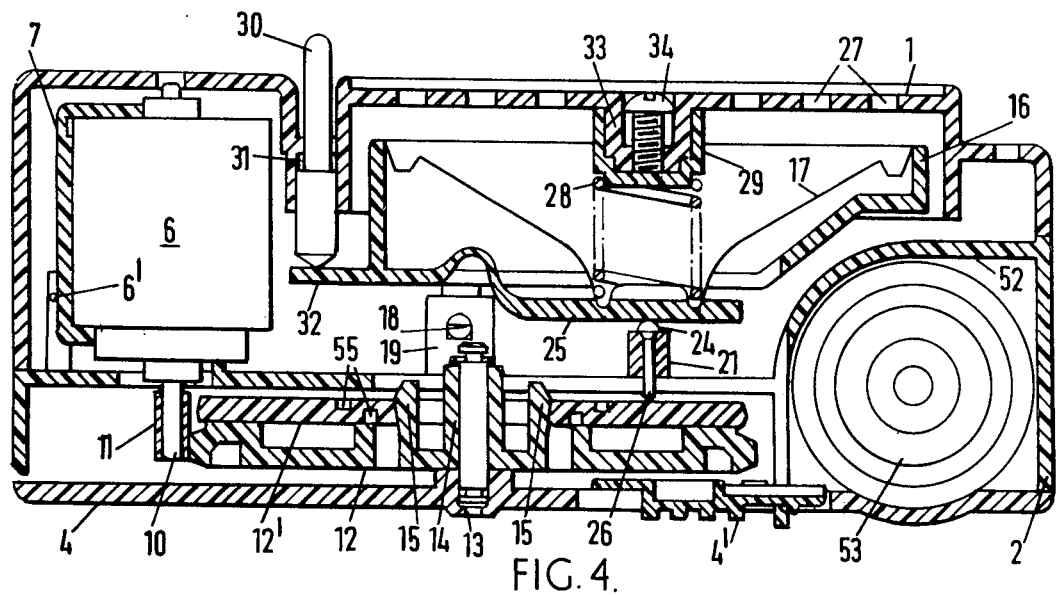
FIG. 4 is a section taken along the line A—A of FIG. 1.
Figure 5:
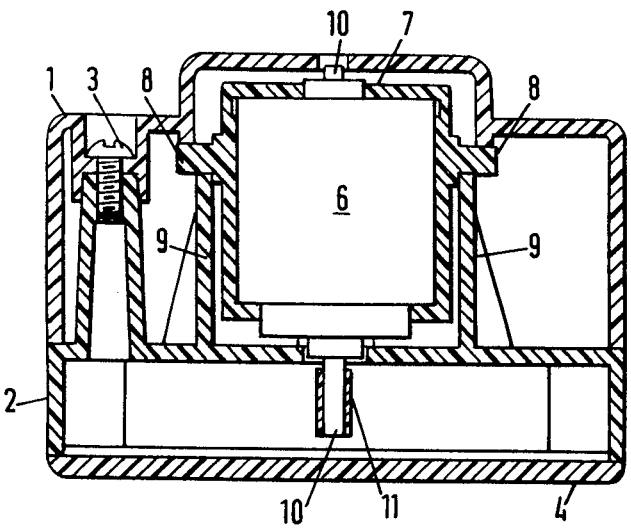
FIG. 5 is a section taken along the line B—B of FIG. 1.
Figure 6:
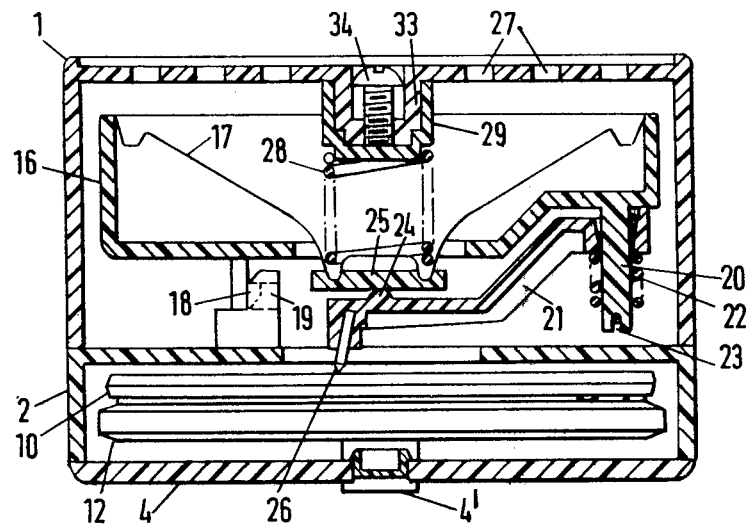
FIG. 6 is a section taken along the line C—C of FIG. 1.

As can be seen from FIGS. 4 and 6 the speaker frame 16 is pivoted downwardly by means of a spring 28 mounted at one end on a support 29 attached to the underside of the top 1 and at the other end in the apex of the diaphragm 17. The diaphragm frame 16 may be pivoted upwardly against the bias of the spring 28 by means of a button 30 mounted in a guide aperture 31 in the top 1 and resting on an extension 32 of the speaker frame 16.

The support 29 is slidably mounted on a boss 33 on the underside of the top 1 and is axially adjustable by means of a screw 34 to alter the bias of the spring 28.

Figure 7:
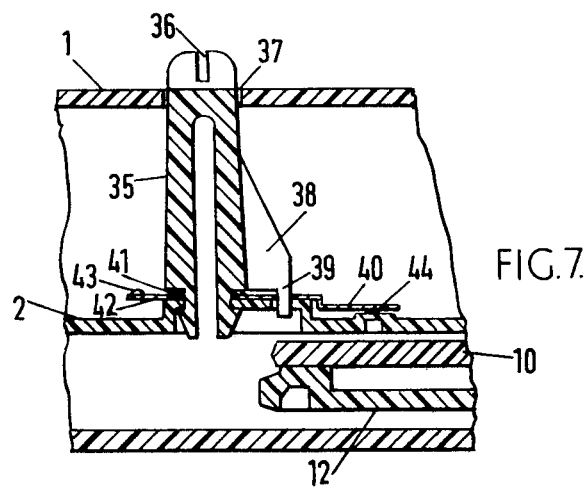
FIG. 7 is a section taken along the line D—D of FIG. 1.

A first terminal of the electric motor 6 is connected to a first battery terminal (not shown) directly by means of a conducting wire (not shown). A second terminal of the electric motor 6 is connected to a second battery terminal (not shown) via a speed controller (FIG. 7) and a switch mechanism shown in detail in FIG. 8.

Figure 8:
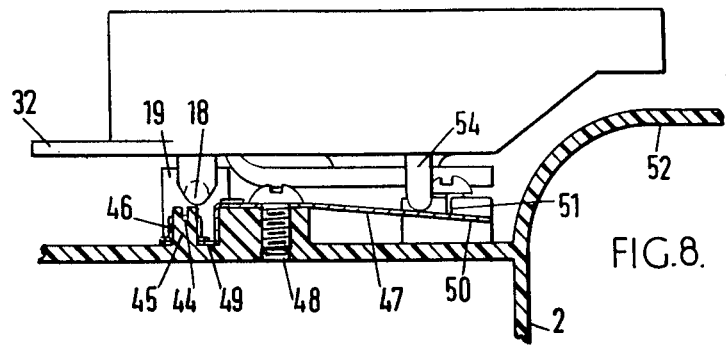
FIG. 8 is a section taken along the line E—E of FIG. 1.

The speed controller (FIG. 7) comprises a spindle 35 pivotably mounted in the base 2 and having a slotted end 36 protruding through an aperture 37 in the top 1. The spindle 35 has a finger 38 engaging an aperture 39 of a metal wiper 40 mounted on the spindle 35 and pivotable therewith with the aid of a spring washer 41. The wiper 40 has an arm 42 connected to a wire 43, which is connected to the second terminal of the electr motor. The wiper 40 is slidable over a wire 44, which extends between two studs 45, one of which is shown in FIG. 8. The wire 44 passes over the top of each stud 45 and is held firmly thereon by means of a metal eyelet 46 fitting tightly over the respective stud 45.

The switch mechanism (FIG. 8) comprises a movable metal strip 47 attached to the base 2 by means of a screw 48 and having an end 49 fitting over the stud 45 thereby electrical connecting the strip 47 to the wire 44 and hence to the second terminal of the motor 6. The strip 47 is resilient and has an end 50 engaging a fixed metal strip 51, which is electrically connected to the second battery terminal. The battery terminals (not shown) are accommodated at opposite ends of a battery housing 52 arranged in the base 2 and containing a battery 53.

The speaker frame 17 has a depending finger 54, which contacts the movable strip 47 and moves the end 50 away from the fixed strip 51 on downward movement of the speaker frame 16.

Instead of the normal spiral turns at the end of each side of the record 12' there are two relatively deep, e.g. 1.25 mm, circular grooves 55. When the stylus reaches a groove 55 it drops into the groove under the bias of the spring 28 urging the diaphragm 17 and speaker frame 16 downwards. As the speaker frame 16 moves downwards, the finger 54 moves the end 50 of the strip 47 away from the metal strip 51 thus breaking the circuit between the battery 53 and the motor 6 and stopping the turntable 12. In order to replay the record, the button 30 is depressed so as to pivot the speaker frame 16 upwardly against the bias of the spring 28. As the speaker frame 16 moves upwards, the tone arm 21 also moved upwards under the axial bias of the spring 22, and the finger 54 moves upwards to allow the strip 47 to contact the strip 51 and again complete the circuit to the motor 6. As soon as the stylus 26 completely emerges from the groove 55 the spring 22 swings the tone arm 21 radially outwards. When the button 30 is released, the speaker frame 16 moves downwards under the bias of the spring 28, and the stylus 26 via the diaphragm support 25, the pip 24, and the tone arm 21 is brought into contact again with the rotating record 12'.

As will be understood from the above, the rest state of the record player is when the stylus is in the groove 55 and the circuit to the motor 6 is broken. The stylus 26 is held firmly in the groove 55 under the bias of the spring 28, thus preventing unintentional movement of the stylus across the record, e.g. in movement or shaking of the record player, thereby preventing damage to the record and/or the stylus.

In order to change a record, the catch 4' is released and the cover 4 is opened. The tone arm 21 is now freed and moves radially outwards. Simultaneously, the speaker frame 16 moves downwards under the bias of spring 28 so that the circuit to the motor 6 is broken. Thus whenever the cover 4 is opened, the motor 6 stops. The record 12' may be replaced by a different record. When the cover is closed the record urges the stylus 26 upwards, thus raising the speaker frame 16 and completing the circuit to the motor 6 so that the new record is played.

The speed of the record may be adjusted by inserting a screw driver in the slot 36 and turning the spindle 35 to increase or decrease the effective length of the wire 44 and hence decrease or increase the speed of the motor 6.

Various modifications may be made to the above-described record player. Thus, the motor may be belt driven by means of an elastic belt extending between the spindle 10 and the turntable 12. Conveniently, the turntable has a peripheral groove accommodating the belt. Since the belt is elastic, the cover 4 can still be opened.

Furthermore, it is not essential that the cover 4 is hingeably attached to the container, but may be attached by any suitable fasteners, e.g. sliding catches. If record changing is not necessary the cover 4 may even be fixedly attached to the container.

I claim:

1. A record player comprising a container, a turntable rotatably mounted therein, a record on said turntable, said record containing a relatively deep circular groove at the end of the sound track, an electric motor for driving the turntable, a motor circuit and switch for enabling and disabling the motor, a speaker mounted in said container for movement toward the turntable, spring means for biasing the speaker toward the turntable, a tone arm having a stylus, movable with the speaker toward the turntable so as to hold the stylus engaged with the record on the turntable, said spring means being operable when the stylus reaches said circular groove to displace the tone arm downwardly to seat the stylus in the groove and means movable downwardly with the speaker and tone arm to disable the switch.

2. A record player according to claim 1, wherein the speaker is carried by a speaker frame pivotably mounted in the container, the speaker frame having a member bearing against the tone arm and the speaker for transmitting vibrations from the record, to the speaker.

3. A record player according to claim 2, wherein the tone arm is mounted on the speaker frame and is biased by means of a spring to move radially outwardly of the turntable and to move towards the turntable, and hence into the said deep groove on the record.

4. A record player according to claim 2 further comprising a depressible member for releasing the stylus from the groove of the record by depression of said member to cause pivoting of the speaker frame away from the turntable.

5. A record player according to claim 1, wherein the switch comprises a resilient metal contact movable away from a fixed metal contact by the speaker frame as the speaker frame moves towards the turntable.

6. a record player according to claim 1 and having a current regulator in the said circuit.

7. A record player according to claim 6, wherein the current regulator comprises a spindle pivotable about its axis and carrying a wiper arm slidable along a wire for altering current supplied to the motor.

8. A record player according to claim 1, wherein the motor has a spindle carrying a friction sleeve which in the closed position of the cover is in driving engagement with the periphery of the turntable.

9. A record player according to claim 1, wherein the turntable has resilient tangs for retaining a record on the turntable, the tangs being resilient deformable to allow removal of the record.

10. A record player comprising a container, a cover removably latched to the container, a turntable rotatably mounted on the cover, a record on the turntable, said record containing a relatively deep circular groove concentric with the center of the record at the end of the sound track, an electric motor for driving the turntable, a motor circuit and switch for enabling and disabling the motor, a speaker, a speaker frame supporting the speaker for movement substantially axially toward the turntable, a tone arm, means pivotally supporting one end of the tone arm on the speaker frame for movement therewith and movement relative thereto toward the turntable and for pivotal movement about said axis parallel to the turntable such that the distal end of the tone arm is free to travel toward and from the center of the turntable, a stylus fixed to the distal end of the tone arm for engagement with the record on the turntable, means associated with the speaker for engagement with the tone arm for transmitting vibrations from the stylus to the speaker, first spring means biasing the speaker frame in a direction to yieldably press the stylus against the record on the turntable supported by the latched cover, second spring means at the proximal end of the tone arm biasing the arm in a direction toward the outer side of the record and toward the speaker frame and yieldable to the pressure of the first spring means when the stylus reaches said circular groove to allow the tone arm to be displaced downwardly relative to the speaker frame to seat the stylus in the groove and be held therein by said first spring means and means on the speaker frame operable, on one hand, by movement of the speaker frame downwardly when the stylus drops into the groove and, on the other hand, by opening of the cover to disable said switch.

11. A record player according to claim 1 comprising means for moving the speaker frame and, hence, the tone arm away from the turntable to lift the stylus from the groove, said second spring means operating when the stylus is lifted from the groove to return the tone arm to the outer side of the record.

* * * * *